US012020568B2

(12) United States Patent
Crooks

(10) Patent No.: US 12,020,568 B2
(45) Date of Patent: Jun. 25, 2024

(54) VEHICLE LOCATING ASSEMBLY AND METHOD OF USE

(71) Applicant: Lynn Crooks, Avon, IN (US)

(72) Inventor: Lynn Crooks, Avon, IN (US)

( * ) Notice: Subject to any disclaimer, the term of this patent is extended or adjusted under 35 U.S.C. 154(b) by 48 days.

(21) Appl. No.: 17/956,508

(22) Filed: Sep. 29, 2022

(65) Prior Publication Data

US 2024/0112578 A1 Apr. 4, 2024

(51) Int. Cl.
*G08G 1/123* (2006.01)

(52) U.S. Cl.
CPC .................................... *G08G 1/123* (2013.01)

(58) Field of Classification Search
CPC ...................................................... G08G 1/123
See application file for complete search history.

(56) References Cited

U.S. PATENT DOCUMENTS

| | | | | |
|---|---|---|---|---|
| 6,203,181 | B1 * | 3/2001 | Gross | G09F 7/18 362/486 |
| D441,524 | S | 5/2001 | Shimizu | |
| 6,363,324 | B1 | 3/2002 | Hidebrant | |
| 6,392,592 | B1 | 5/2002 | Johnson | |
| 6,529,142 | B2 | 3/2003 | Yeh | |
| 7,242,321 | B2 | 7/2007 | New | |
| 8,547,253 | B2 | 10/2013 | Proefke | |
| 8,786,468 | B2 | 7/2014 | Tieman | |
| 2006/0244574 | A1 * | 11/2006 | New | B60R 25/24 340/426.22 |
| 2008/0168543 | A1 * | 7/2008 | von Krogh | H04L 9/12 726/9 |
| 2019/0325239 | A1 * | 10/2019 | Meyer | G06V 20/59 |

FOREIGN PATENT DOCUMENTS

| | | |
|---|---|---|
| CA | 2316615 | 5/2001 |

* cited by examiner

*Primary Examiner* — Nabil H Syed
*Assistant Examiner* — Cal J Eustaquio

(57) ABSTRACT

A vehicle locating assembly for wirelessly locating a vehicle includes a target module and a locator module. The target module is attachable to an interior element of a vehicle and emits a response signal upon receipt of an identification signal. The locator module can be held in a hand of a user and transmits and receives the identification signal and the response signal, respectively. The locator module comprises an automatic radio direction finder (ADF) and a direction indicator. The ADF is enabled to determine a direction of the target module, relative to the locator module, and to signal the direction indicator to indicate a location of the vehicle to the user.

14 Claims, 5 Drawing Sheets

VEHICLE LOCATING ASSEMBLY AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle locating assemblies and more particularly pertains to a new vehicle locating assembly for wirelessly locating a vehicle. The present invention discloses a locating assembly for use in locating a vehicle which is difficult to locate, such as a vehicle parked amid a plurality of vehicles in a parking lot.

(2) Description of Related Art Including Information Disclosed Under 37 CFR 1.97 and 1.98

The prior art relates to vehicle locating assemblies, which may comprise stationary signal processing devices in vehicles, which are used in combination with a mobile transmitting devices in possession of users to locate vehicles, as discussed in U.S. Pat. Nos. 6,529,142, 7,242,321, and 8,786,468. These references do not teach a mobile signal processing device in combination with a stationary transmitting device, which allows for triangulation to pinpoint location of a vehicle. Related prior art includes Global Positioning System enabled devices capable of locating vehicles.

BRIEF SUMMARY OF THE INVENTION

An embodiment of the disclosure meets the needs presented above by generally comprising a target module and a locator module. The target module is configured to be attachable to an interior element of a vehicle and to emit a response signal upon receipt of an identification signal. The locator module is configured to be held in a hand of a user and to transmit and to receive the identification signal and the response signal, respectively. The locator module comprises an automatic radio direction finder (ADF) and a direction indicator. The ADF is enabled to determine a direction of the target module, relative to the locator module, and to signal the direction indicator to indicate a location of the vehicle to the user.

Another embodiment of the disclosure includes a vehicle locating system, which comprises a vehicle and a vehicle locating assembly, as disclosed above. Yet another embodiment of the disclosure includes a method of locating a vehicle comprising a provision step, which entails providing a vehicle locating assembly according to the specification above. An installation step of the method entails attaching the target module to the interior element of the vehicle. An operational step of the method entails actuating the locator module when locating the vehicle is required. A directional step of the method is observing the direction indicator. An outcome step of the method is following the direction indicator to the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
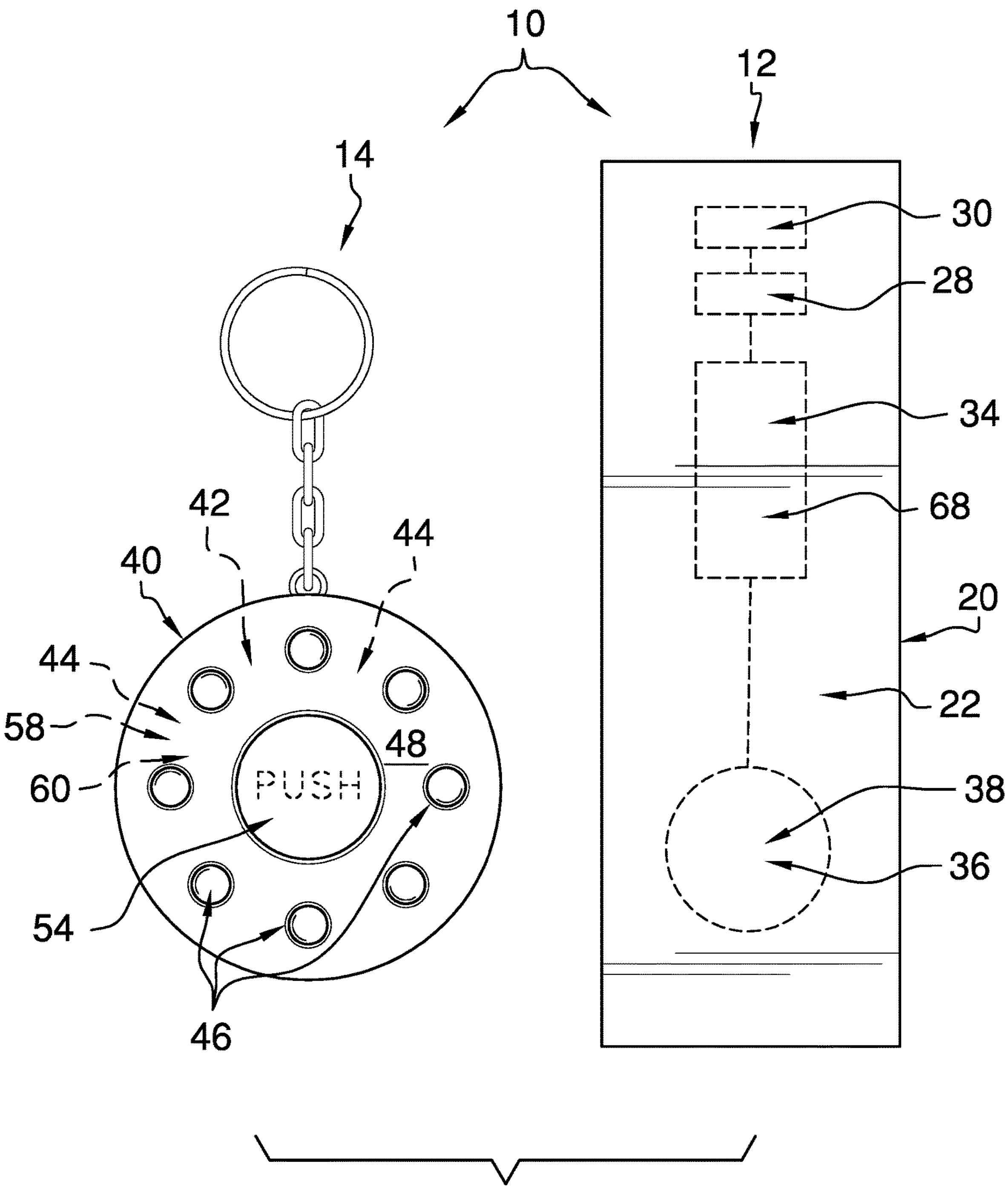
FIG. 1 is a front view of a vehicle locating assembly according to an embodiment of the disclosure.
Figure 2:
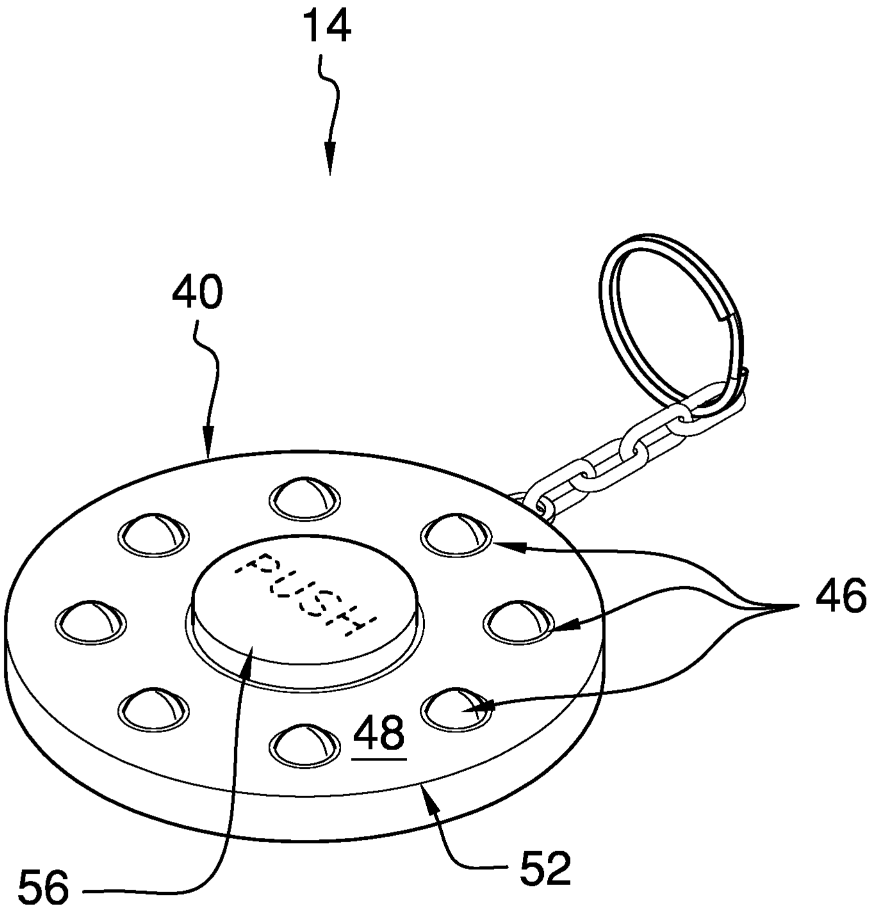
FIG. 2 is an isometric perspective view of an embodiment of the disclosure.

With reference now to the drawings, and in particular to FIGS. 1 through 5 thereof, a new vehicle locating assembly embodying the principles and concepts of an embodiment of the disclosure and generally designated by the reference numeral 10 will be described.

As best illustrated in FIGS. 1 through 5, the vehicle locating assembly 10 generally comprises a target module 12 and a locator module 14. The target module 12 is configured to be attachable to an interior element 16 of a vehicle 18 and to emit a response signal upon receipt of an identification signal. The target module 12 comprises a target housing 20, which defines an interior space 22. The target housing 20 may be configured for attachment to one or both of a windshield 24 and a rearview mirror 26 of the vehicle 18 or may be configured for attachment to other interior elements 16 of the vehicle 18, such as, but not limited to, a dash, a headliner, a rear window, or the like.

A target receiver 28, a target transmitter 30, a target power module 32, and a target microprocessor 34 are attached to the target housing 20 and are positioned in the interior space 22. The target microprocessor 34 is operationally engaged to the target receiver 28, the target transmitter 30, and the target power module 32. The present invention anticipates the target power module 32 comprising one or both of a target battery 36 and an electrical circuit 38 of the vehicle 18.

Figure 3:
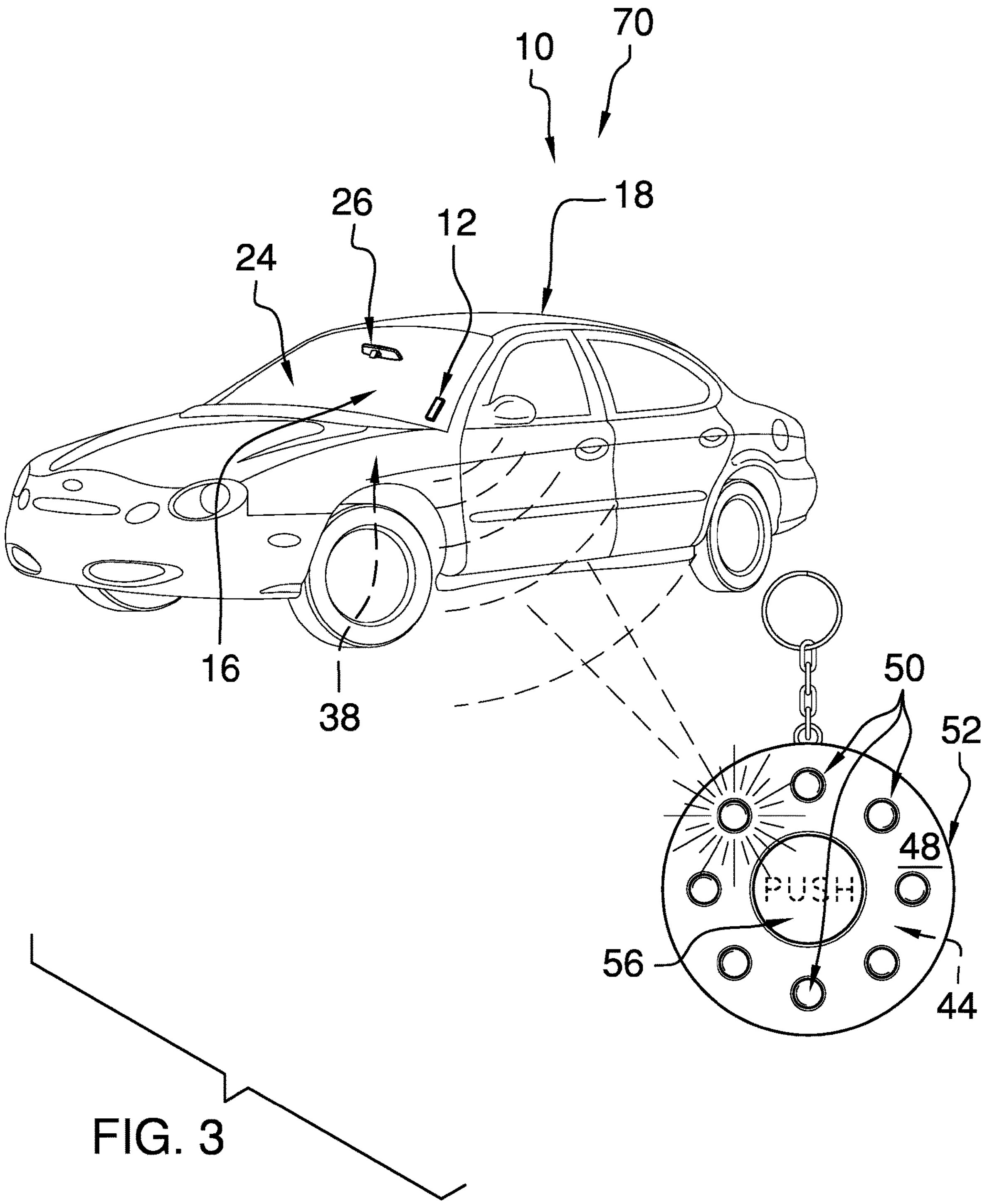
FIG. 3 is an in-use view of an embodiment of the disclosure.
Figure 4:
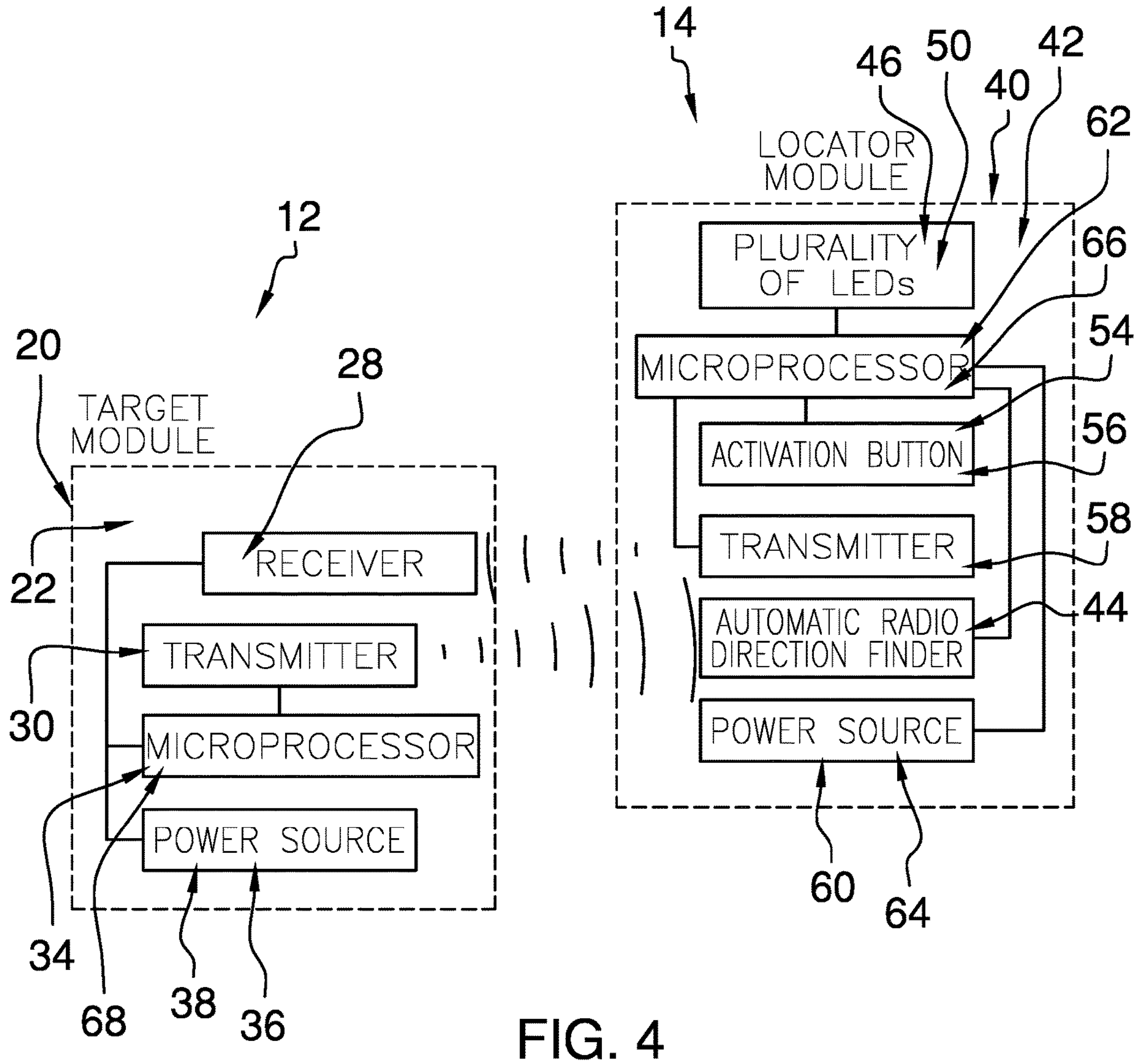
FIG. 4 is a block diagram view of an embodiment of the disclosure.
Figure 5:
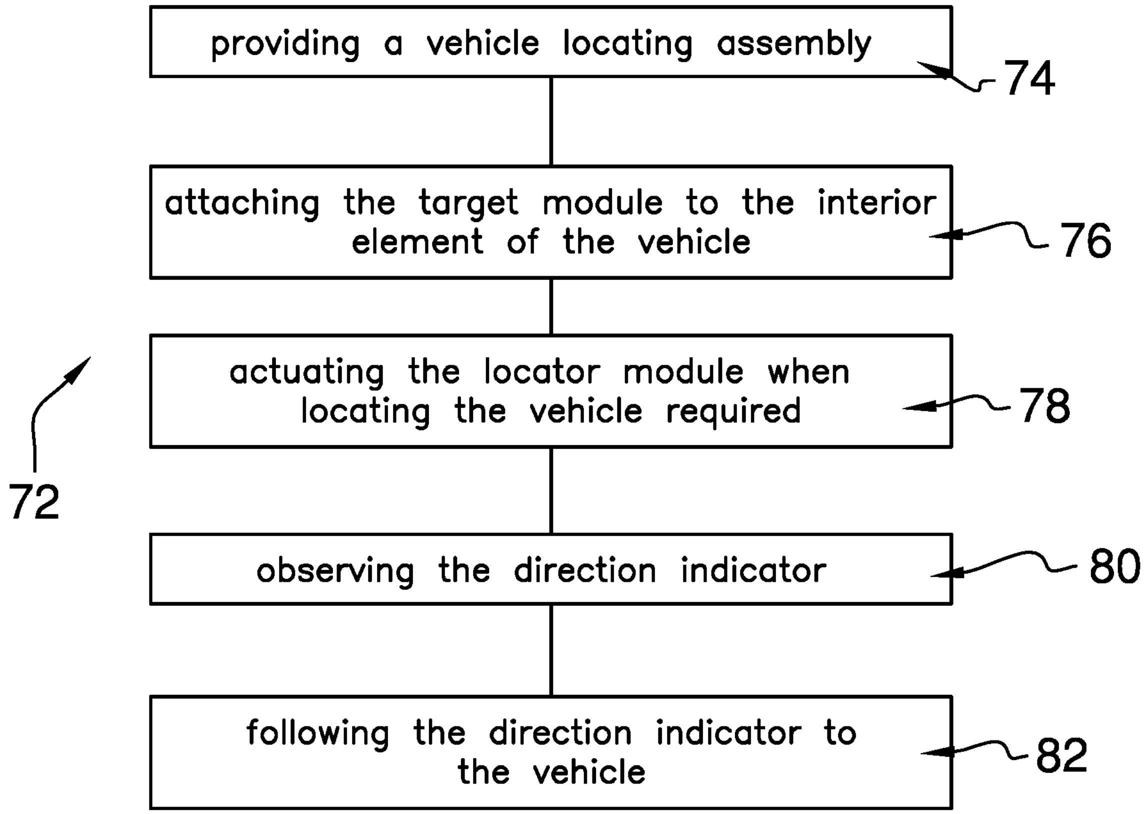
FIG. 5 is a flow diagram for a method utilizing an embodiment of the disclosure.

The locator module 14 is configured to be held in a hand of a user, to transmit the identification signal, and to receive and the response signal. The locator module 14 comprises a locator housing 40, which defines an internal space 42 and which may be disc shaped, as shown in FIG. 3, cuboid, octagonal, or the like. The locator housing 40 may be sized so that the locator housing 40 is configured for one or more of insertion into a pocket, insertion into a purse, and attachment to a key chain.

An automatic radio direction finder (ADF) 44 is attached to the locator housing 40 and is positioned in the internal space 42. The present invention anticipates various configurations of ADFs 44 known to those skilled in the art of direction finders, such as, but not limited to, ADFs 44 comprising multi-antenna arrays with one locator receiver, ADFs 44 comprising multi-antenna circular arrays wherein each antenna is sampled in succession to determine Doppler shift, or the like.

A direction indicator 46 is attached to an upper face 48 of the locator housing 40. The direction indicator 46 may comprise a plurality of light emitting diodes 50, which extends circumferentially around the upper face 48 proximate to a perimeter 52 of the upper face 48, or other indicating means, such as, but not limited to, display panels, dials, selectively illuminable arrows, or the like. A switch 54 is attached to the locator housing 40. The switch 54 may comprise a depressible button 56, which is centrally positioned on the upper face 48, or other switching means, such as, but not limited to, toggles, slides, or the like.

A locator transmitter 58, a locator power module 60, and a locator microprocessor 62 are attached to the locator housing 40 and are positioned in the internal space 42. The present invention anticipates the locator power module 60 comprising a locator battery 64 to allow for portability. The locator microprocessor 62 is operationally engaged to the direction indicator 46, the switch 54, the locator transmitter 58, the ADF 44, and the locator power module 60.

Locator programming code 66 and target programming code 68 are positioned on the locator microprocessor 62 and the target microprocessor 34, respectively. The locator programming code 66 and the target programming code 68 enable transmission and receipt of the identification signal by the locator module 14 and the target module 12 respectively, upon switching of the switch. The locator programming code 66 and the target programming code 68 also enable transmission and receipt of the response signal by the target module 12 and the locator module 14, respectively. The ADF 44 is enabled to determine a direction of the target module 12, relative to the locator module 14, and to signal the direction indicator 46 to indicate a location of the vehicle 18 to the user. With the direction indicator 46 comprising eight light emitting diodes 50, as shown in FIG. 1, it is configured to indicate the direction of the vehicle 18 within 45°. The present invention also anticipates the locator programming code 66 enabling triangulation of the target module 12 upon movement of the locator module 14 from a first position to a second position.

The present invention also anticipates a vehicle locating system 70 comprising a vehicle 18 and a vehicle locating assembly 10, as described above and as shown in FIG. 3. The target module 12 of the vehicle locating assembly 10 is attached to the windshield 24 of the vehicle 18 in this example.

The present invention is anticipated to improve personal safety, convenience, and peace-of-mind by allowing a user to proceed to their vehicle 18, quickly and discreetly. The present invention is anticipated to useful in locating a vehicle 18 in large parking lots of a variety of venues, such as, but not limited to, arenas, coliseums, racetracks, stadiums, golf venues, concerts, zoos, amusement parks, large employers, college campuses, holiday festivals, shopping malls, box stores, strange towns or locations, airport parking, and the like. Even in smaller parking lots, the present invention can prevent confusion and facilitate locating of a vehicle 18 that is out of sight.

In use, the vehicle locating assembly 10 enables a method of locating a vehicle 72 comprising a provision step 74, which entails providing a vehicle locating assembly 10 according to the specification above. An installation step 76 of the method 72 entails attaching the target module 12 to the interior element 16 of the vehicle 18. An operational step 78 of the method 72 entails actuating the locator module 14 by depressing the depressible button 56 when locating the vehicle 18 is required. A directional step 80 of the method 72 is observing the direction indicator 46. An outcome step 82 of the method 72 is following the direction indicator 46 to the vehicle 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle locating assembly comprising:

a target module configured to be attachable to an interior element of a vehicle and for emitting a response signal upon receipt of an identification signal, the target, module comprising:

a target housing defining an interior space, a target receiver attached to the target housing and positioned in the interior space, a target transmitter attached to the target housing and positioned in the interior space, a target power module attached to the target housing and positioned in the interior space, and a target microprocessor attached to the target housing, positioned in the interior space, and operationally engaged to the target receiver, the target transmitter, and the target power module;

a locator module configured to be held in a hand of a user and for transmitting and receiving the identification signal and the response signal, respectively, the locator module comprising an automatic radio direction finder (ADF) and a direction indicator, such that the ADF is enabled for determining a direction of the target module relative to the locator module and for signaling the direction indicator to indicate a location of the vehicle to the user, the locator module comprising:

a locator housing defining an internal space, the ADF being attached to the locator housing and positioned in the internal space, the direction indicator being attached to an upper face of the locator housing, a switch attached to the locator housing, a locator transmitter attached to the locator housing and positioned in the internal space, a locator power module attached to the locator housing and positioned in the internal space, and a locator microprocessor attached to the locator housing, positioned in the internal space, and operationally engaged to the direction indicator, the switch, the locator transmitter, the ADF, and the locator power module; and locator programming code and target programming code positioned on the locator microprocessor and the target microprocessor, respectively, enabling transmission and receipt of the identification signal by the locator module and the target module respectively, upon switching of the switch, and transmission and receipt of the response signal by the target module and the locator module, respectively, enabling the ADF for determining a direction of the target module relative to the locator module and for signaling the locator microprocessor to actuate the direction indicator, the locator programming code enabling triangulation of the target module upon movement of the locator module from a first position to a second position, wherein a first distance between the target module and the first position and a second distance between the target module and the second position are used to triangulate the target module.

2. The vehicle locating assembly of claim 1, wherein the target housing is configured for attachment to one or both of a windshield and a rearview mirror of the vehicle.

3. The vehicle locating assembly of claim 1, wherein the locator housing is disc shaped.

4. The vehicle locating assembly of claim 3, wherein the direction indicator comprises a plurality of light emitting diodes extending circumferentially around the upper face proximate to a perimeter of the upper face.

5. The vehicle locating assembly of claim 1, wherein the locator housing is sized such that the locator housing is configured for one or more of insertion into a pocket, insertion into a purse, and attachment to a key chain.

6. The vehicle locating assembly of claim 1, wherein the switch comprises a depressible button centrally positioned on the upper face.

7. The vehicle locating assembly of claim 1, wherein the target housing is configured for attachment to one or both of a windshield and a rearview mirror of the vehicle; and the direction indicator comprises a plurality of light emitting diodes extending circumferentially around the upper face proximate to a perimeter of the upper face, the locator housing being disc shaped, the locator housing being sized such that the locator housing is configured for one or more of insertion into a pocket, insertion into a purse, and attachment to a key chain, the switch comprising a depressible button centrally positioned on the upper face.

8. A vehicle locating system comprising:

a vehicle;

a target module attached to an interior element of a vehicle and configured for emitting a response signal upon receipt of an identification signal, the target module comprising:

a target housing defining an interior space, a target receiver attached to the target housing d positioned in the interior space, a target transmitter attached to the target housing and positioned in the interior space, a target power module attached to the target housing and positioned in the interior space, and a target microprocessor attached to the target housing, positioned in the interior space, and operationally engaged to the target receiver, the target transmitter, and the target power module;

a locator module configured to be held in a hand of a user and for transmitting and receiving the identification signal and the response signal, respectively, the locator module comprising an automatic radio direction finder (ADF) and a direction indicator, such that the ADF is enabled for determining a direction of the target module relative to the locator module and for signaling the direction indicator to indicate a location of the vehicle to the user, the locator module comprising:

a locator housing defining an internal space, the ADF being attached to the locator housing and positioned in the internal space, the direction indicator being attached to an upper face of the locator housing, a switch attached to the locator housing, a locator transmitter attached to the locator housing and positioned in the internal space, a locator power module attached to the locator housing and positioned in the internal space, and a locator microprocessor attached to the locator housing, positioned in the internal space, and operationally enraged to the direction indicator, the switch, the locator transmitter, the ADF, and the locator power module; and locator programming code and target programming code positioned on the locator microprocessor and the target microprocessor, respectively, enabling transmission and receipt of the identification signal by the locator module and the target module respectively, upon switching of the switch, and transmission and receipt of the response signal by the target module and the locator module, respectively, enabling the ADF for determining a direction of the target module relative to the locator module and for signaling the locator microprocessor to actuate the direction indicator, the locator programming code enabling triangulation of the target module upon movement of the locator module from a first position to a second position, wherein a first distance between the target module and the first position and a second distance between the target module and the second position are used to triangulate the target module.

9. The vehicle locating system of claim 8, wherein the target housing is attached to a windshield or a rearview mirror of the vehicle.

10. The vehicle locating system of claim 8, wherein the locator housing is disc shaped and sized such that the locator housing is configured for one or more of insertion into a pocket, insertion into a purse, and attachment to a key chain.

11. The vehicle locating system of claim 10, wherein the direction indicator comprises a plurality of light emitting diodes extending circumferentially around the upper face proximate to a perimeter of the upper face.

12. The vehicle locating system of claim 8, wherein the switch comprises a depressible button centrally positioned on the upper face.

13. A method of locating a vehicle comprising the steps of:

providing a vehicle locating assembly comprising:

a target module configured to be attachable to an interior element of a vehicle and for emitting a response signal upon receipt of an identification signal, the target module comprising:

a target housing defining an interior space;

a target receiver attached to the target housing and positioned in the interior space;

a target transmitter attached to the target housing and positioned in the interior space;

a target power module attached to the target housing and positioned in the interior space; and a target microprocessor attached to the target housing, positioned in the interior space, and operationally engaged to the target receiver, the target transmitter, and the target power module;

a locator module configured to be held in a hand of a user and for transmitting and receiving the identification signal and the response signal, respectively, the locator module comprising an automatic radio direction finder (ADF) and a direction indicator, such that the ADF is enabled for determining a direction of the target module relative to the locator module and for signaling the direction indicator to indicate a location of the vehicle to the user, the locator module comprising:

a locator housing defining an internal space, the ADF being attached to the locator housing and positioned in the internal space, the direction indicator being attached to an upper face of the locator housing;

a switch attached to the locator housing;

a locator transmitter attached to the locator housing and positioned in the internal space;

a locator power module attached to the locator housing and positioned in the internal space; and a locator microprocessor attached to the locator housing, positioned in the internal space, and operationally engaged to the direction indicator, the switch, the locator transmitter, the ADF, and the locator power module; and locator programming code and target programming code positioned on the locator microprocessor and the target microprocessor, respectively, enabling transmission and receipt of the identification signal by the locator module and the target module respectively, upon switching of the switch, and transmission and receipt of the response signal by the target module and the locator module, respectively, enabling the ADF for determining a direction of the target module relative to the locator module and for signaling the locator microprocessor to actuate the direction indicator, the locator programming code enables triangulation of the target module upon movement of the locator module from a first position to a second position, wherein a first distance between the target module and the first position and a second distance between the target module and the second position are used to triangulate the target module;

attaching the target module to the interior element of the vehicle;

actuating the locator module when locating the vehicle is required;

observing the direction indicator; and following the direction indicator to the vehicle.

14. The method of locating a vehicle of claim 13, wherein the locator housing is disc shaped; and the direction indicator comprises a plurality of light emitting diodes extending circumferentially around the upper face proximate to a perimeter of the upper face; and the switch comprises a depressible button centrally positioned on the upper face.

* * * * *